Patented Apr. 21, 1931

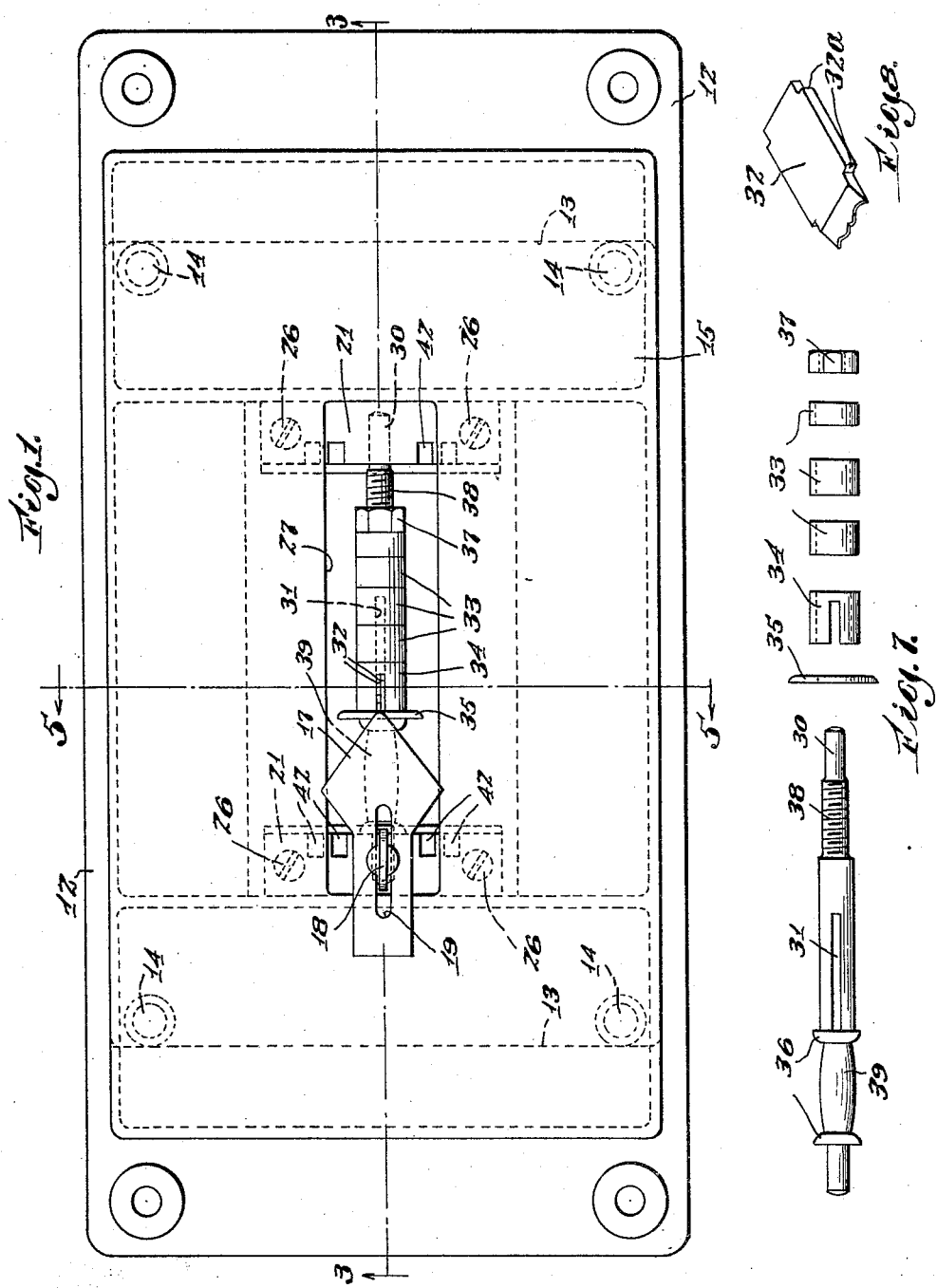

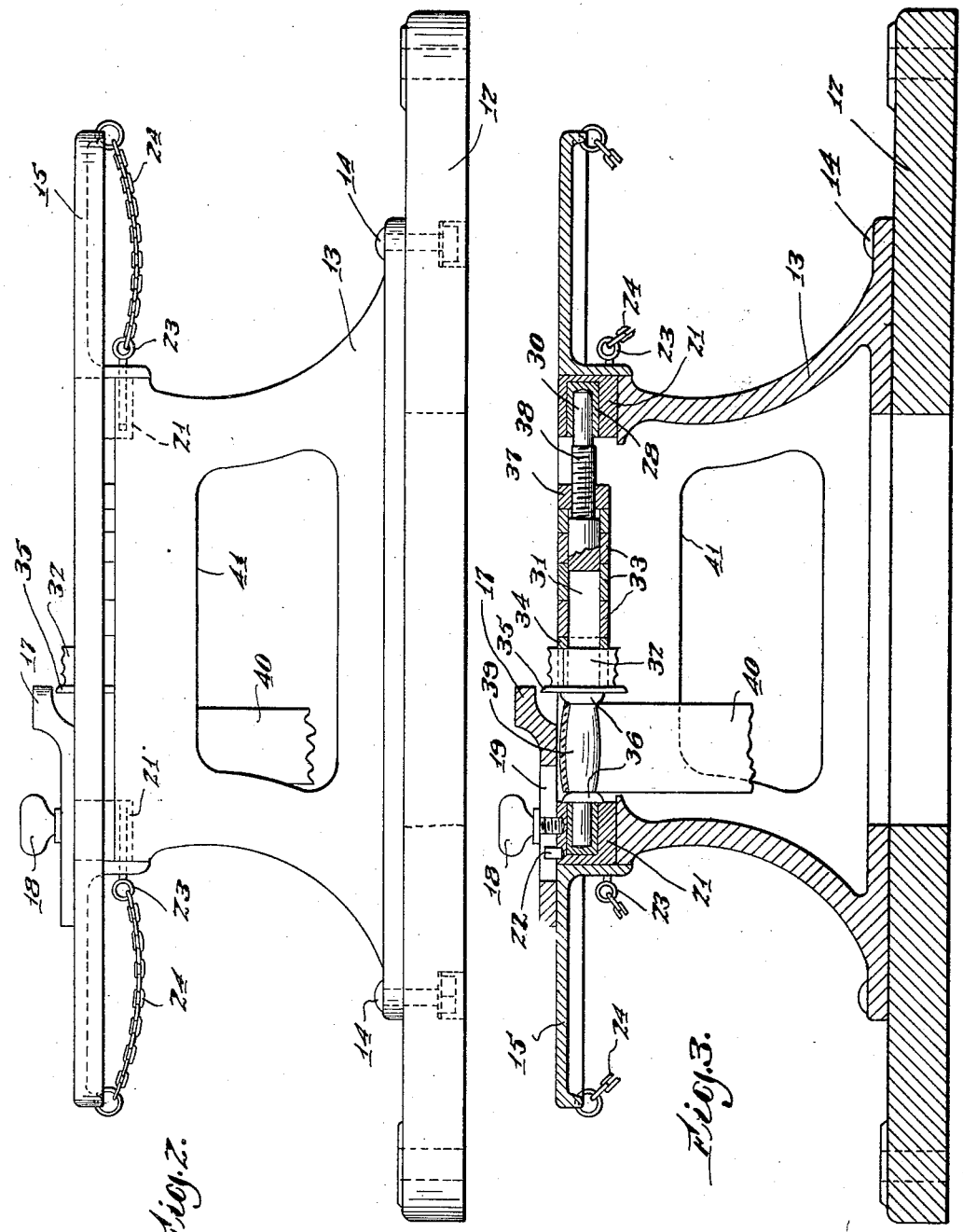

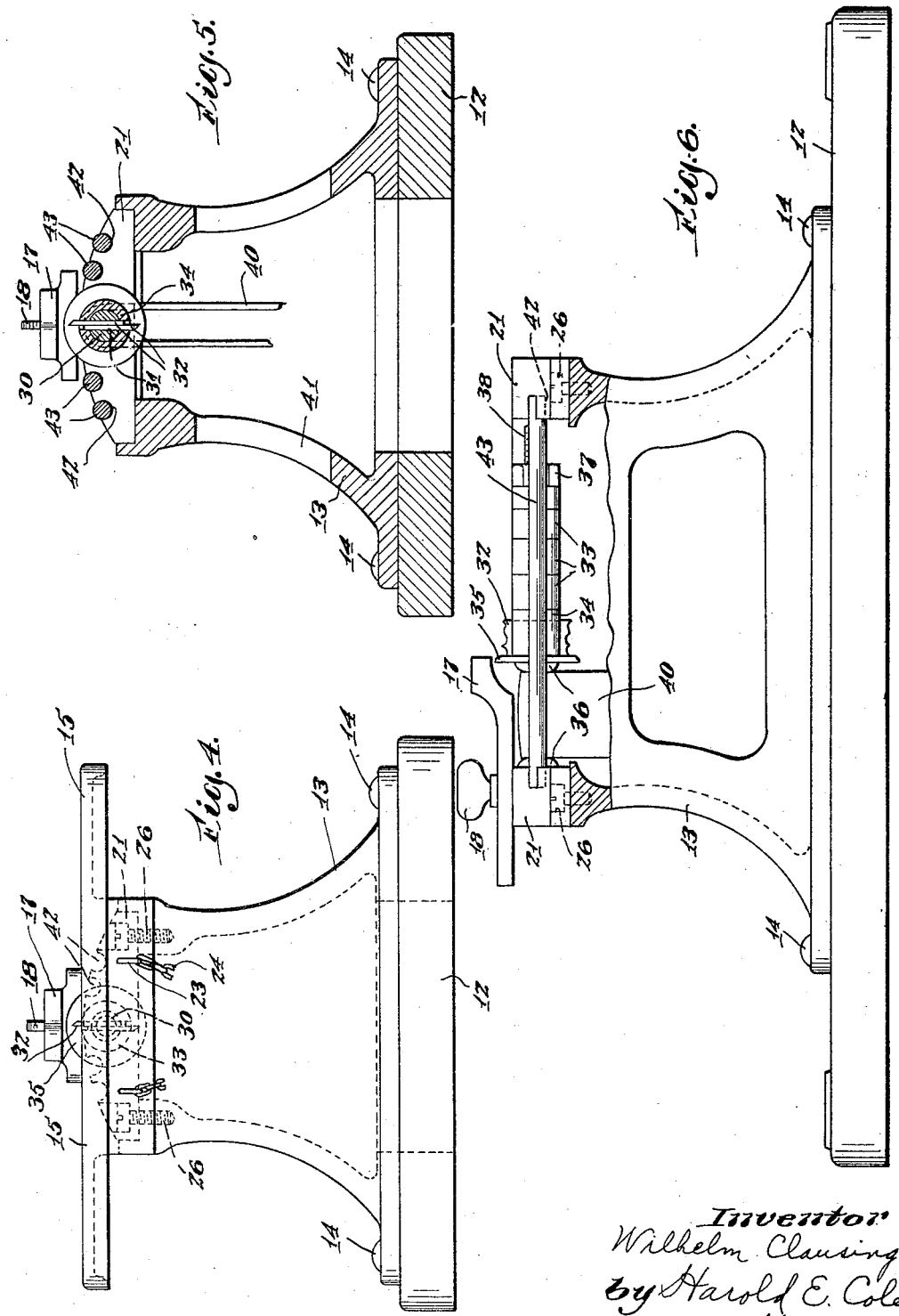

1,801,722

UNITED STATES PATENT OFFICE

WILHELM CLAUSING, OF ROSLINDALE, MASSACHUSETTS

WOODWORKING MACHINE

Application filed July 22, 1930. Serial No. 469,774.

This invention relates to wood working machines and more particularly to a machine designed to cut grooves and the like in wood and such material.

Heretofore when it was desired to cut grooves in a piece of wood all of whose surfaces are curved it has been necessary to do the work by hand, using a tool such as a gouge. Also even with pieces of wood having both curved and flat, level surfaces it has been necessary to cut the groove in the flat, level surface by hand, on account of the curved surfaces, which would have to rest on the work support or table, not being level.

One of my objects is to provide a machine which will form grooves in pieces of wood of any curvature and do other molding work, thereby eliminating much hand labor now necessary to accomplish this. Another object is to so construct my machine that the cost is relatively small, the operation simple and the assembly and disassembly of the cutting knives easily and quickly accomplished.

Still another object is to make my machine safe to operate by so arranging the cutting knives that the fingers of the operator are shielded at all times by the work and will not come in contact with the knives even in a moment of carelessness.

The foregoing and other objects which will appear as the nature of the invention is better understood, may be accomplished by a construction, combination and operative arrangement of parts such as is disclosed by the drawings. The nature of the invention is such as to render it susceptible to various changes and modifications, and, therefore, I am not to be limited to the construction disclosed by the drawings; but am entitled to all such changes therefrom as fall within the scope of my claims.

In the drawings:

Figure 1 is a plan view of my machine.

Figure 2 is a front elevation.

Figure 3 is a section on the line 3—3 of Figure 1.

Figure 4 is an end elevation.

Figure 5 is a section on the line 5—5 of Figure 1, but with the top removed.

Figure 6 is a side elevation with the top removed showing a work resting rod mounted in the bearing.

Figure 7 is a side elevation of my spindle and the parts disassembled which are adapted to be mounted thereon.

Figure 8 is a perspective view of a cutting knife.

As illustrated my machine is adapted to rest on a bench or table although it may be provided with its own floor support or stand if desired. It consists of an open base 12 to which an open pedestal 13 is bolted or fastened as at 14. A removable top 15 is supported by said pedestal 13, which top is provided with an adjustable work gauge or guide 17 which may be of various shapes suited to the kind of work to be done, and which is held in position by a wing screw 18 which extends through an elongated slot 19 in said guide into a screw threaded hole formed in a bearing 21. When it is desired the gauge 17 may be pushed out of the way by unscrewing said wing screw 18, thereby permitting the gauge to be moved to one side and away from the work. A dowel pin 22 projects slightly above the top surface of said bearing 21 and contacts with the side of the slot 19 to prevent any rotation or sidewise movement of said gauge. Said gauge rests partly on the top 15 and partly on the bearing 21 and when the top is removed it rests wholly on said bearing. Pins 23 with chains 24 attached at one end are inserted through holes made in the under side of said top 15 and in said bearing 21 to hold said top securely in position. Said bearing 21 is bolted as at 26 to said pedestal 13.

Said top 15 is provided with an aperture 27 sufficiently large to permit free rotation of the cutting knives and guide washer later described. Bushings 28 are fitted in the bearing holes in which a spindle 30 is horizontally and rotatably mounted. Said spindle 30 is provided with an elongated through slot 31 in which cutting or molding knives 32 are inserted. Inasmuch as my machine may be equipped with knives of various sizes this slot 31 is made long enough to accommodate the longest knife, spacer bushings 33 being used to assist in holding the knives 32 in place.

A holding bushing 34 is also used, having slots in both sides opposite each other, through which slots the knives extend a predetermined distance when said slots are brought into alinement with the spindle slot 31. One side of said knives 32 is flush against the closed end of the slot in said bushing 34 when the machine is ready for use. The knives may be provided with notches 32a in which event the notched or extending portion fits under each side of the holding bushing 34 at the end of each slot in said bushing, thereby locking said knives against any vertical movement.

A guide washer 35 is fitted on said spindle 30, being flush with one of the pulley guides 36, one side of said knives 32 being flush against this washer 35 when they are in operative position. The number of bushings 33 used, as well as their size, depends upon the size or length of the knives, and it is an easy matter to choose the correct bushings for the particular knives used, as a bushing screw nut 37 screws on the threaded portion 38 of the spindle, the tightening of which firmly holds the bushings 33 in place, the end thrust serving to hold the knives tightly between said washer 35 and the closed end of the slot in said bushing 34. In accordance with the usual practice, in doing wood molding of this nature it is preferable to use two knives, the blades of which project through opposite openings in the spindle slot 31 and the slots in said bushing 34. Shims, not shown, may be used to fit the knives tightly in said spindle slot. The washer 35 serves as a guide, and rotates with the spindle, part of this washer and the cutting blades of the knives projecting through the aperture 27 in the top 15. It will be noticed that said work gauge 17 may be adjusted so that its outer face or working surface is in alinement with the outer face of the guide washer 35, serving as a guide for pieces of wood which extend above the top of said washer 35. Various shapes of gauges may be used, for instance, an arrow shape is desirable as shown in Figure 1, when the shape of the piece of wood being molded is such that the upper portion of a rectangular gauge would be in the way, and in some cases only the guide washer 35 is needed, in which event said gauge may be slid to one side and out of the way as previously explained.

Part of said spindle 30 provides a pulley portion 39 located between the pulley guides 36, and a belt 40 is shown on said pulley portion driven by any suitable source of power, not shown.

The pedestal 13 is provided with a large opening 41, so that there may be plenty of room below the bearing 21 when cutting a groove in a long, curved or almost circular piece of wood, as the wood can be more conveniently positioned for cutting if one end may extend into this opening 41 under the bearing.

In cutting grooves in certain pieces of wood, such as those with sharp curves, the top 15 would not permit certain portions of the wood to be brought into contact with the knives, in which instances the top must be removed, which may readily be done by removing the pins 23 and lifting it off. The bearing 21 is provided with slots 42 open at the top in which work resting rods 43 are rotatably supported. These slots 42 are located at the front and back portions of the bearing, so that the work may be rested on said rods 43 before and after the groove has been cut. The rods may readily be removed as the slots are open at the top as shown, and are interchangeable, and one or more may be used depending upon the shape of the work.

The operation of this machine is simple and safe, the power driven belt 40 rotating the spindle at a high speed. The work is pressed forwardly and downwardly against the rapidly rotating knives 32 keeping one side against the guide washer 35 and gauge 17 until the desired groove has been cut in the wood. The depth of the groove is determined by the distance the blades of the knives project above the top 15, and this distance is predetermined before the bushing screw nut 37 is tightened. My machine may be used to do straight grooving as well as curved, and in doing away with the vertical spindle with its horizontally projecting blades which are extremely dangerous, I have provided a machine which will do all the work previously done without the attending danger, and in addition it does work which heretofore was necessarily done by hand.

What I claim is:

1. A wood working machine comprising a spindle having a slot therein intermediate the ends thereof and having a threaded portion, a knife adapted to be inserted in said slot with the blade portion projecting beyond the body portion of said spindle, a slotted bushing on said spindle into which slot said knife extends, a plurality of bushings on said spindle adapted to force said slotted bushing against said knife, screw threaded means adapted to cooperate with said screw threaded spindle portion, the tightening of which screw threaded means forces said slotted bushing against said knife in and said slotted bushing, means to rotatably support said spindle in a horizontal position and means to rotate said spindle.

2. A wood working machine comprising a support, a top resting on said support, a bearing mounted on said support, a spindle rotatably mounted in said bearing in a horizontal position adjacent said top, said spindle having provision to accommodate a knife, a guide member mounted on said spindle at one side of said knife, a bushing mounted on said spindle at the opposite side of said knife, and means on said spindle adapted to be tightened to thereby firmly hold said knife in said spindle between said guide member and said bushing, said top having an aperture through which a portion of said knife and a portion of said guide member extends above said top, and means to rotate said spindle.

3. A wood working machine comprising supporting means, a top having an aperture therein removably mounted on said supporting means, a spindle horizontally and rotatably mounted in said supporting means adjacent said top provided with a slot extending through the whole body thereof into which slot cutting knives are adapted to be inserted, a work guide at one side of said knives a portion of which guide extends through said aperture above said top, bushing means mounted on said spindle and adapted to contact with an opposite side of said knives, said bushing means being adapted to be tightened to thereby hold said knives firmly between said work guide and said bushing means, and means to rotate said spindle.

4. A wood working machine comprising supporting means, a bearing mounted on said supporting means, said bearing having a plurality of slots on each side, each pair of said slots being adapted to receive a resting rod, a spindle horizontally and rotatably mounted in said bearing, said spindle being adapted to hold a knife which is adapted to cut grooves in a piece of wood as said spindle is rotated and said piece of wood is brought into contact with said knife, and means to rotate said spindle in said bearing.

5. A wood working machine comprising supporting means, a bearing mounted on said supporting means, a work gauge mounted on said bearing, a spindle horizontally and rotatably mounted in said bearing, means to rotate said spindle, a cutting knife mounted in said spindle, a work guide mounted on said spindle at one side of said knife, the working surface of said work gauge being substantially in alinement with the working surface of said work guide, and means bearing against one side of said knife to hold said knife in cutting position.

6. A wood working machine comprising a spindle adapted to rotate in a horizontal position, means to support said spindle and the work to be cut, a work gauge adjustably mounted on said means, a guide member mounted on said spindle, said work gauge being adapted to cooperate above and with said guide member to guide the work as it is being cut, adjustable means spaced from said guide member and mounted on said spindle, a cutting knife mounted in said spindle between said guide member and said adjustable means, said adjustable means being adapted to be moved into contact with said knife and thereby tightly hold said knife against said guide member, and means to rotate said spindle.

7. A wood working machine comprising supporting means, a bearing mounted on said supporting means, a spindle horizontally mounted in said bearing, a top having an aperture therein resting on said supporting means, an adjustable gauge resting on said top and bearing having a slot therein, a removable pin member extending through said gauge slot into said bearing to hold said gauge in position, a guide washer mounted on said spindle and adapted to cooperate with said gauge to furnish a guiding surface for the work as it is being cut, a cutting knife in said spindle in contact with said guide washer at one side, a portion of said guide washer and knife projecting through said aperture in said top, a slotted bushing enclosing a portion of said knife and in contact with one side, and removable means adapted to hold said slotted bushing in contact with said knife while the spindle is being rotated, and means to rotate said spindle.

8. A spindle for a wood working machine adapted to be horizontally rotated and having an elongated slot adapted to receive a knife, comprising a pulley portion, a threaded portion, a guide member mounted on said spindle, a bushing having an elongated slot therein, said bushing slot being adapted to be brought into alinement with said spindle slot whereby it may enclose a portion of said knife, a threaded member adapted to be screwed onto said spindle threaded portion and thereby force said slotted bushing against said knife and also force said knife against said guide member whereby said knife is firmly held in position.

9. A spindle for a wood working machine adapted for horizontal rotation having an elongated slot, comprising a pulley portion, a threaded portion, a guide washer mounted on said spindle, a bushing having elongated slots therein in each side opposite each other mounted on said spindle, a cutting knife inserted in said spindle slot and bushing slots, a plurality of bushings mounted on said spindle adjacent said slotted bushing, and a screw threaded nut adapted to screw on said spindle threaded portion and force said bushings closely together to thereby hold said knife tightly between said guide washer and said slotted bushing.

10. A wood working machine comprising a spindle having an opening therein intermediate the ends thereof, cutting means adapted to be inserted in said opening and have a portion project beyond the body portion of said spindle, instrumentalities on said spindle at one side of and adapted to be tightened against said cutting means, work guiding means adapted to rotate with said spindle a portion of which guiding means projects beyond the body portion of said spindle, said guiding means being located at a side of said cutting means opposite the first-mentioned side, means to rotatably support said spindle in a horizontal position, and means to rotate said spindle.

11. A wood working machine comprising a spindle having a slot therein intermediate the ends thereof and having a threaded portion, cutting means adapted to be inserted in said slot having a portion thereof projecting beyond the body portion of said spindle, slotted means on said spindle into which slot said knife extends, means on said spindle adapted to force a slotted portion of said bushing against said knife, said latter mentioned means embodying screw threaded instrumentalities adapted to cooperate with said screw threaded spindle portion the tightening of which instrumentalities forces said slotted bushing against said knife, means to rotatably support said spindle in a horizontal position, and means to rotate said spindle.

12. A wood working machine comprising supporting means, a top having an aperture therein mounted on said supporting means, a spindle horizontally and rotatably mounted in said supporting means adjacent said aperture, said spindle having an opening therein intermediate its ends thereof adapted to accommodate a cutting knife, a cutting knife in said opening a portion of which projects beyond the body of said spindle into and above said aperture, a work guide at one side of said knife, instrumentalities adapted to be moved into contact with said knife to thereby hold it firmly in cutting position, and means to rotate said spindle.

WILHELM CLAUSING.